United States Patent
Tsujimoto

[19]

[11] Patent Number: 6,075,808
[45] Date of Patent: Jun. 13, 2000

[54] SPREAD SPECTRUM TIME DIVERSITY COMMUNICATIONS SYSTEM

[75] Inventor: Ichiro Tsujimoto, Tokyo, Japan

[73] Assignee: NEC Corporation, Tokyo, Japan

[21] Appl. No.: 09/018,893

[22] Filed: Feb. 5, 1998

Related U.S. Application Data

[62] Division of application No. 08/620,246, Mar. 22, 1996, Pat. No. 5,757,853.

[30] Foreign Application Priority Data

Mar. 22, 1995 [JP] Japan ..................................... 7-062821

[51] Int. Cl.[7] .................................................. H04B 1/707
[52] U.S. Cl. ............................................ 375/143; 375/152
[58] Field of Search ..................................... 375/140, 141, 375/142, 143, 147, 150, 152; 370/320, 335, 342, 441

[56] References Cited

U.S. PATENT DOCUMENTS

| | | | |
|---|---|---|---|
| 5,461,610 | 10/1995 | Weerackody | 375/146 |
| 5,471,497 | 11/1995 | Zehavi | 375/142 |
| 5,677,929 | 10/1997 | Asano et al. | 375/141 |

*Primary Examiner*—Don N. Vo
*Attorney, Agent, or Firm*—Sughrue, Mion, Zinn, Macpeak & Seas, PLLC

[57] ABSTRACT

In a time diversity radio communications system, quadrature-modulated spread spectrum signals of different mutual time delay are combined into a code division multiplex signal and up-converted to a radio-frequency signal and transmitted. At a receive site, the signal is received by an antenna and down-converted to recover the code division multiplex signal. Quadrature-modulated component signals contained in the recovered code division multiplex signal are converted to baseband signals which are then time-aligned with each other. The time-aligned baseband signals are multiplied respectively by complex weighting factors and are combined together to produce an input signal for an adaptive equalizer. This input signal is also applied to an AGC amplifier where it is amplified and applied to correlation detectors where correlations between the amplified signal and the baseband signals are detected and the complex weighting factors are derived respectively from the correlations. In a modified embodiment, the quadrature-modulated component signals are fed into an adaptive RAKE matched filter where the output of the AGC amplifier is used for detecting the correlations.

7 Claims, 5 Drawing Sheets

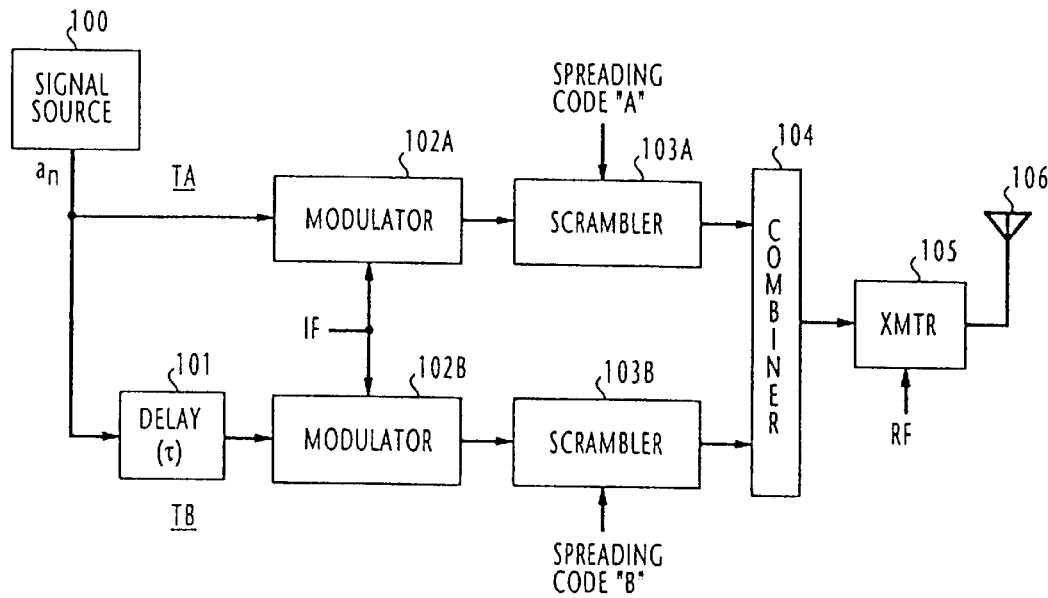
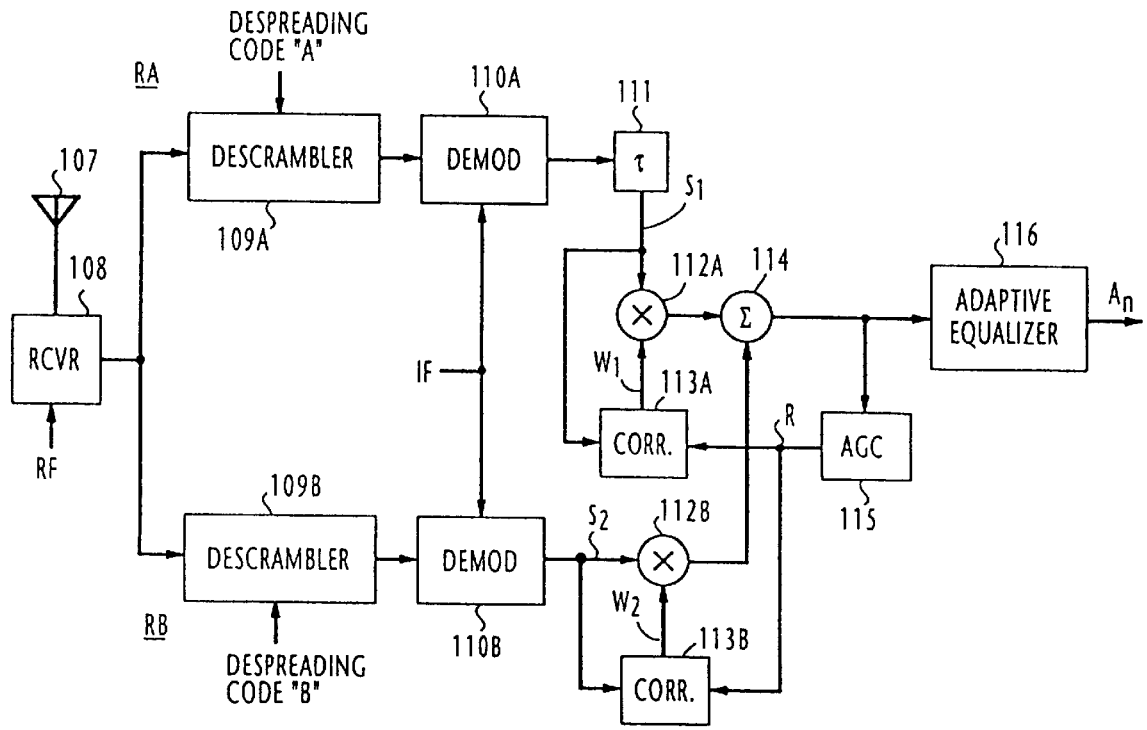

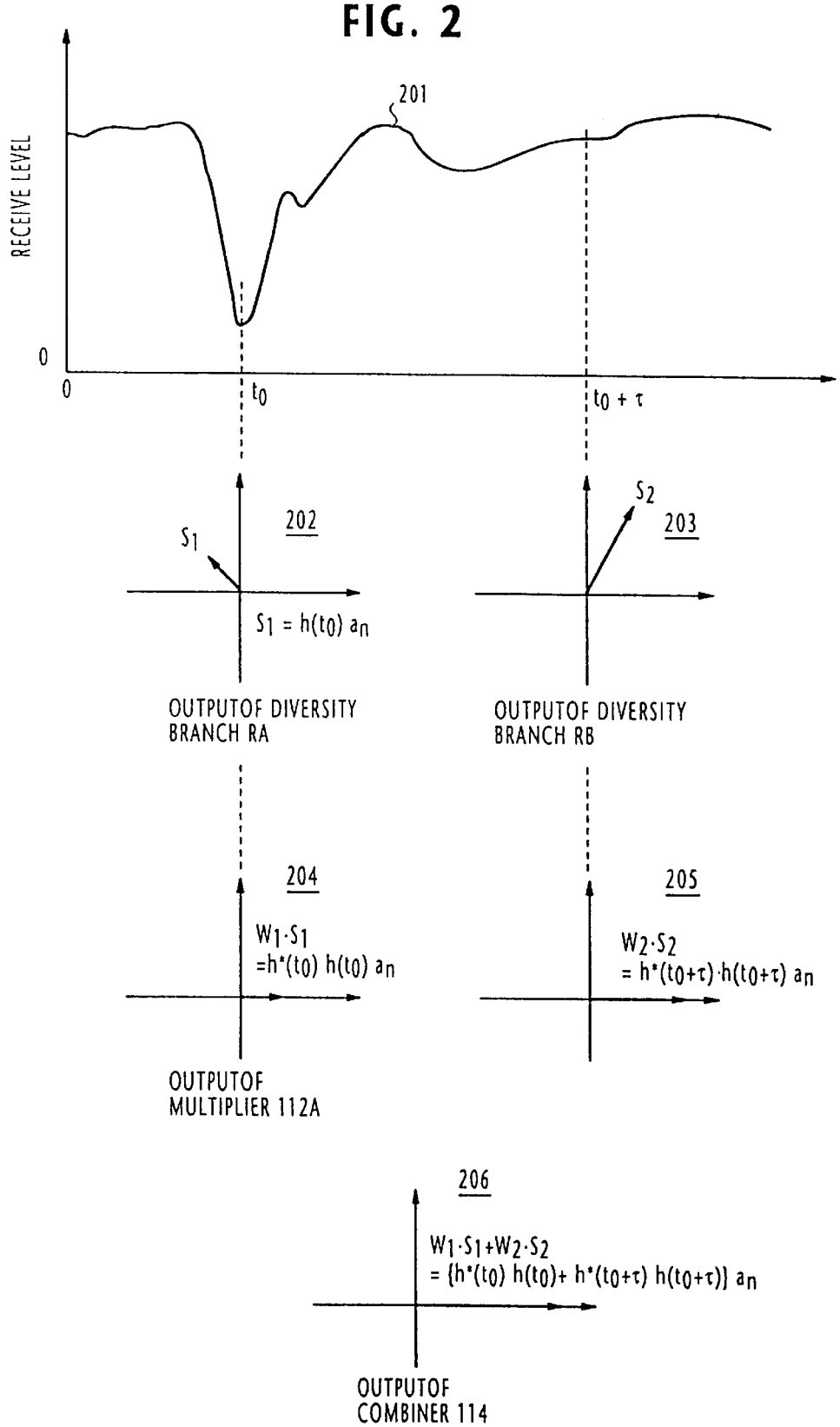

SPREAD SPECTRUM TIME DIVERSITY COMMUNICATIONS SYSTEM

This is a divisional of application Ser. No. 08/620,246 filed Mar. 22, 1996 which is now U.S. Pat. No. 5,757,853.

BACKGROUND OF THE INVENTION

1. Field of the Invention

The present invention relates to a diversity radio communications systems for multipath fading channels, using a spread spectrum multiplexing technique.

2. Description of the Related Art

In radio communications systems where frequency-selective, multipath fading occurs, the waveform of transmitted symbols is affected by the time dispersal effect of the fading channel. Diversity reception and adaptive equalization techniques are normally employed to combat this problem. One of the known techniques is the frequency-and-time diversity reception wherein an intermediate-frequency modulated information-bearing signal and a delayed replica of this signal are up-converted to two radio signals of different frequencies and transmitted from a single antenna. At a receive site, the transmitted signals are demultiplexed onto separate diversity branches where they are low-noise amplified and down-converted to IF signals from which baseband signals are recovered. One of the baseband signals is delayed so that they are time coincident with each other and then compared with each other. One of the signals that is less distorted is selected as an input to an adaptive equalizer where multipath-fading related intersymbol interference is canceled. Alternatively, the time-aligned signals are modified both in phase and amplitude so that they are maximal-ratio combined to produce an input to the adaptive equalizer. However, due to the use of two radio frequencies, the cost of high-power transmitters and low-noise receivers is substantial if the number of diversity branches increases.

Another prior art approach is concerned with the space-time diversity reception technique. As described in Japanese Provisional Patent Publication Sho-63-286027, a radio-frequency modulated signal and a delayed replica of this signal are transmitted from respective antennas which are spaced so that the transmitted signals propagate through separate multipath Rayleigh fading channels and received by a single antenna at a receive site, where the received signals are down-converted to baseband signals with a differential delay between them. These signals are diversity combined in a RAKE equalizer. While the cost of the receive site is reduced by the use of a single antenna, the use of two antennas at the transmit site would add an extra cost if the system is to be used in a microwave communications where large aperture antennas are required.

SUMMARY OF THE INVENTION

It is therefore an object of the present invention to use spread spectrum multiplexing and time diversity reception techniques for radio communication to minimize cost and equipment size.

According to a first aspect of the present invention, there is provided a radio communications system which comprises a multiplexer circuit for producing a plurality of quadrature-modulated spread spectrum information-bearing signals using quadrature carriers of single frequency and a plurality of spreading codes, and combining the quadrature-modulated spread spectrum information-bearing signals to produce a code division multiplex signal, there being a predetermined inter-signal time delay between the quadrature-modulated spread spectrum information-bearing signals. The code division multiplex signal is up-converted to a radio-frequency signal and transmitted. At a receive site, the transmitted signal is received by an antenna and down-converted to recover the code division multiplex signal. A demultiplexer circuit is provided for converting a plurality of quadrature-modulated component signals contained in the recovered multiplex signal to a plurality of information-bearing signals using quadrature carriers of the single frequency and a plurality of despreading codes respectively identical to the spreading codes so that the plurality of information-bearing signals are time coincident with each other. The information-bearing signals from the multiplexer circuit are multiplied respectively by a plurality of complex weighting factors and combined together to produce a combined information-bearing signal. An automatic gain controlled (AGC) amplifier is provided for amplifying the combined information-bearing signal. The complex weighting factors are derived from correlations between the output of the AGC amplifier and the information-bearing signals from the demultiplexer circuit.

According to a second aspect of this invention, the receive site includes a demultiplexer circuit for converting a plurality of quadrature-modulated component signals contained in the recovered multiplex signal to a plurality of information-bearing signals using quadrature carriers of the single frequency and a plurality of despreading codes respectively identical to the spreading codes, and a first combiner for combining the plurality of information-bearing signals into a combined information-bearing signal. An adaptive RAKE matched filter is provided, which comprises a delay line having a plurality of successive taps for receiving the combined information-bearing signal, the delay time between the successive taps corresponding to the predetermined inter-signal time delay, a plurality of complex multipliers for respectively weighting tap signals from the taps of the delay line by complex weighting factors, a second combiner for combining the weighted tap signals to produce a combined weighted signal for coupling to an adaptive equalizer, and a plurality of correlation detectors for respectively deriving the complex weighting factors from correlations between a decision output from the adaptive equalizer and a plurality of delayed versions of tap signals at the taps of the delay line, one of the delayed versions being time coincident with the decision output.

BRIEF DESCRIPTION OF THE DRAWINGS

The present invention will be described in further detail with reference to the accompanying drawings, in which:

FIGS. 1A and 1B are block diagrams of a transmitting apparatus and a receiving apparatus of a diversity radio communications system, respectively, according to a first embodiment of the present invention;

FIG. 2 shows signal vectors appearing in the receiving apparatus of FIG. 1B when a deep fade occurs in a received signal;

DETAILED DESCRIPTION

Figure 3A:
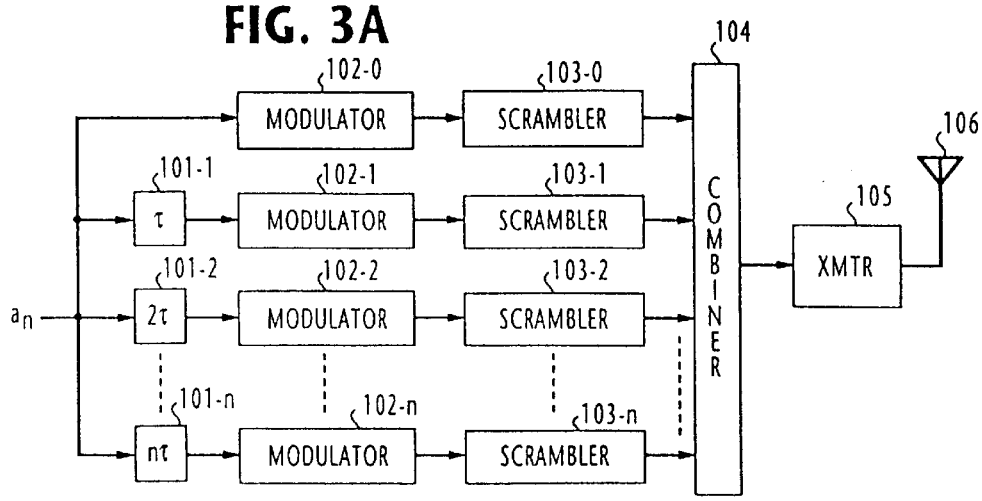
FIGS. 3A and 3B are block diagrams of a generalized form of a transmit and a receive site of the system.

Referring now to FIG. 1A, there is shown a transmitting apparatus of a time-diversity radio communications system according to a first embodiment of the present invention. The transmiting apparatus of the system essentially comprises a multiplexer circuit connected to a signal source 100 which generates a series of transmit information-bearing symbols $a_n$. The multiplexer includes first and second diversity branches TA and TB. The first branch TA includes a quadrature modulator 102A such as PSK (phase shift keying) or QAM (quadrature amplitude modulation) modulator connected to the signal source 100. In the modulator 102A, the input signal is mapped onto a set of complex signals (sin and cosine values) which are respectively modulated onto quadrature carriers at intermediate frequency by means of an in-phase mixer and a quadrature mixer and combined together by a summer to produce a quadrature-modulated (PSK or QAM) information-bearing symbol data. The output of modulator 102A is fed into a scrambler 103A where it is with a spreading code A of pseudorandom sequence to produce a first code division component signal.

The second branch TB is similar to branch TA with the exception that it includes a delay element 101 for providing a predetermined amount of delay $\tau$ to the symbol data. The delay time $\tau$ is greater than the intervals at which the information-bearing symbols occur. The delayed symbol is modulated onto the intermediate frequency quadrature carriers by a modulator 102B, and spread with a spreading code B in a scrambler 103B to produce a second code division component signal.

It is to be noted that, in each diversity branch, the positions of the modulator 102 and scrambler 103 can be interchanged substantially without any effect on system performance. The outputs of scramblers 103A and 103B are combined together in a combiner 104 to produce a code division multiplex signal. This signal is up-converted to a radio frequency signal and high-power amplified in a transmitter 105 and transmitted from an antenna 106.

At a receive site of the diversity communications system, shown in FIG. 1B, the transmitted signal is received by an antenna 107, and then low-noise amplified and down-converted by a receiver 108 using the same quadrature radio-frequency carriers as used at the transmit site. The output of receiver 108 is applied to first and second diversity branches RA and RB. The diversity branch RA includes a descrambler 109 for despreading the output of receiver 108 with a first despreading code A identical to the first spreading code A to produce a replica of the output signal of the modulator 102A. This signal is applied to a quadrature (PSK or QAM) demodulator 110A where it is demodulated with a carrier of the same intermediate frequency as that used in the transmit site. The output of demodulator 110A is delayed by a delay element 111 by the same amount $\tau$ as that introduced to the transmitter's diversity branch TB at the transmit site, producing an output signal of the first diversity branch RA. The receiver's diversity branch RB also includes a descrambler 109B for despreading the output of receiver 108 with a second despreading code B identical to the second spreading code B to produce a replica of the output signal of the modulator 102B. This signal is applied to a quadrature demodulator 110B where it is quadrature demodulated with carriers of the same intermediate frequency as that used in the transmit site, producing an output signal of the receiver's diversity branch RB.

The outputs of receiver's diversity branches RA and RB are supplied respectively as signals $S_1$ and $S_2$ to complex multipliers 112A and 112B where they are multiplied with first and second tap-weight signals $W_1$ and $W_2$ of complex value supplied respectively from correlation detectors 113A and 113B. The outputs of complex multipliers 112A and 112B are maximal-ratio combined in a diversity combiner 114 to produce a replica of the original symbol data though it may have been corrupted during transmission. The output of diversity combiner 114 is fed to an adaptive equalizer 116 such as decision feedback equalizer to cancel multipath fading related intersymbol interference (ISI) and a decision output symbol $A_n$ is produced. The diversity combiner 114 output is further used as a feedback signal by an automatic gain controlled amplifier 115 where the amplitude (envelope) of the signal is detected.

The detected amplitude is applied as a reference signal R to the correlation detectors 113A and 113B which derive complex tap-weight coefficients $W_1$ and $W_2$ from correlations between the reference signal and the output signals $S_1$ and $S_2$ of the diversity branches RA and RB.

Assume that the receive level of the incoming signal varies with time as indicated by a curve 201 in FIG. 2 where the signal drops significantly at time $t_0$ due to a deep fade and the diversity branch output signals $S_1$ and $S_2$ are respectively indicated by vectors 202 and 203 having different phase angles. The signal received at time $t_0$ through the diversity branch RA is a product of the transmitted symbol "$a_n$" by a complex transfer coefficient $h(t_0)$ of the communication channel. The same symbol "$a_n$" is received again at time $t_0+\tau$ through the diversity branch RB as a product of $a_n$ by a complex transfer coefficient $h(t_0+\tau)$ of the communication channel. Due to the delay element 111, the input signals $S_1$ and $S_2$ of the complex multipliers 112A and 112B are time coincident with each other and consequently given by:

$$S_1 = h(t_0) \cdot a_n \tag{1}$$

$$S_2 = h(t_0+\tau) \cdot a_n \tag{2}$$

The output signal "y" of the diversity combiner 114 is given in the form:

$$y = \{W_1 \cdot h(t_0) + W_2 \cdot h(t_0+\tau)\} \cdot a_n \tag{3}$$

Since the reference signal R from the AGC amplifier 115 can be considered as having a normalized amplitude, it can be represented as:

$$R = 1 \cdot a_n \tag{4}$$

The tap-weight value $W_1$ detected by correlator 113A is the result of multiplying complex conjugates of the input signal $S_1$ by the reference signal R and time-averaging the product using an RC (resistance-capacitance) network lowpass filter in the case of analog circuits or successive updating processes in the case of digital circuits. Likewise, the tap-weight value $W_2$ detected by correlator 113B is the result of multiplying complex conjugates of the input signal $S_2$ by reference signal R and time-averaging the product. Therefore, tap-weight values $W_1$ and $W_2$ are represented by:

$$\begin{aligned}W_1 &= E[S_1^* \cdot a_n] \\ &= E[\{h(t_0)a_n\}^* \cdot a_n] \\ &= E[h^*(t_0)] \cdot E[a_n^* \cdot a_n]\end{aligned} \tag{5}$$

$$W_2 = E[S_2^* \cdot a_n] \quad (6)$$
$$= E[\{h(t_0 + \tau)a_n\}^* \cdot a_n]$$
$$= E[h^*(t_0 + \tau)] \cdot E[a_n^* \cdot a_n]$$

where E[ ] represents the time-averaging process, and where the autocorrelation $E[a_i^* \cdot a_j]$ of data symbols can be represented by Kronecker delta $\delta_{ij}$=i(if i=j) or 0(if i≠j).

The time interval in which the time-averaging process is performed is sufficiently longer than the symbol interval but sufficiently shorter than the interval at which fading is likely to occur. Thus, the fading variations are not averaged out and consequently they do not contribute to the correlation. Equations (5) and (6) can therefore be rewritten as:

$$W_1 = h^*(t_0) \quad (7)$$

$$W_2 = h^*(t_0+\tau) \quad (8)$$

As a result, the output signals of the complex multipliers 112A and 112B are given by the following relations:

$$W_1 \cdot S_1 = h^*(t_0) \cdot h(t_0) \cdot a_n \quad (9)$$

$$W_2 \cdot S_2 = h^*(t_0+\tau) \cdot h(t_0+\tau) \cdot a_n \quad (10)$$

Equations (9) and (10) indicate that the transfer coefficients are transformed into real numbers in the dimension of power.

In FIG. 2, the outputs of the complex multipliers 112A and 112B are aligned in phase to the real axis and amplified by a squared value of transfer coefficient as indicated by vectors 204 and 205. Therefore, the output signals of the complex multipliers 112A and 112B are maximal ratio combined by the diversity combiner 114 to produce an output signal "y" which is indicated by a vector 206 in the form:

$$y = \{h^*(t_0) \cdot h(t_0) + h^*(t_0+\tau) \cdot h(t_0+\tau)\} \cdot a_n \quad (11)$$

Since the terms $h(t_0)$ and $h(t_0+\tau)$ vary with independent Rayleigh fading, the variations in the diversity branch outputs $S_1$ and $S_2$ are uncorrelated with each other. By the maximal ratio combining process of the branch output signals, the communications system of this invention operates in a time diversity mode.

If a deep fade should occur at time $t_0+\tau$ as well as at time $t_0$, signal interruption inevitably occurs. To ensure against such interruptions, it is preferable to provide as many diversity branches as possible.

Figure 3B:
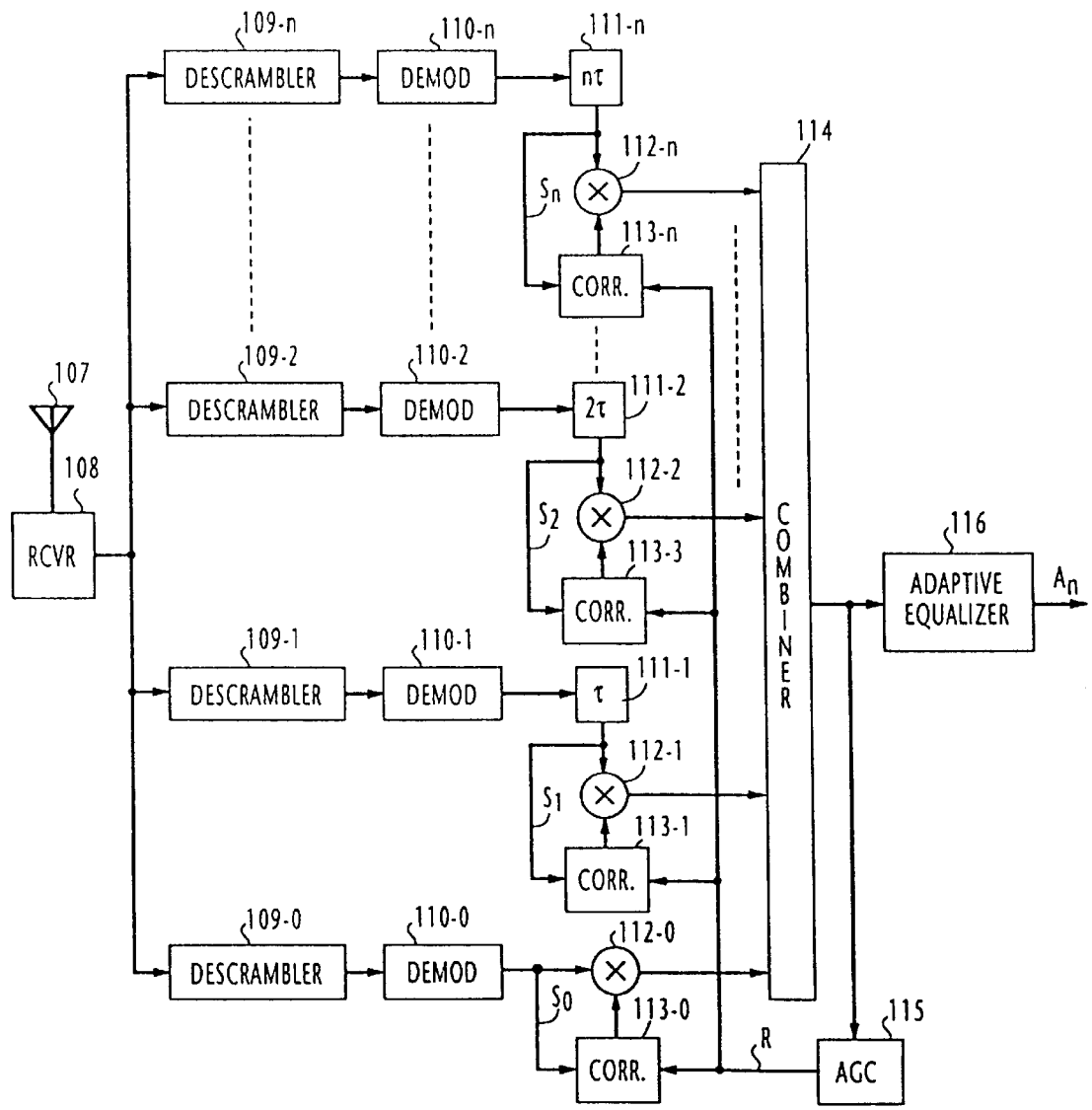

A generalized form of the time diversity radio communications system is shown in FIGS. 3A and 3B. In FIG. 3A, the transmit site includes (n+1) diversity branches with a delay time difference τ between adjacent branches. Delay elements 101-1 to 101-n of delay times τ, 2τ, . . . , nτ are provided in the second to (n+1)th diversity branches, respectively. Quadrature-modulators 102-0–102n are provided respectively in the first to the (n+1)th diversity branches and scramblers 103-0–103-n are connected to the corresponding quadrature modulators. Using (n+1) different spreading codes, the scramblers 103-0–103n supply their spread spectrum component signals to the combiner 104 to produce a code division multiplex signal. In FIG. 3B, the receive site includes (n+1) diversity branches corresponding in number to the diversity branches of the transmit site. Similar to the transmit site, a delay time difference τ is established between adjacent branches by delay elements 111-1, 111-2, . . . 111-n having delay times τ, 2τ, . . . , nτ, respectively. The delay elements 111-1 to 111-n are respectively connected to the output of quadrature demodulators 110-1 to 101-n of the second to (n+1)th diversity branches. Descramblers 109-0–109-n, connected to the receiver 108, use (n+1) despreading codes identical to the (n+1) spreading codes to despread the output of the receiver and supply their outputs to the corresponding demodulators. Correlators 113-0–113-n are connected to the output of AGC amplifier 115 to detect correlations between the reference signal R and the output signals $S_0$–$S_n$ from the corresponding diversity branches. With the use of an increasing number of diversity branches of different delay times, there is a less likelihood of encountering deep fades at successive instants of time.

Figure 4:
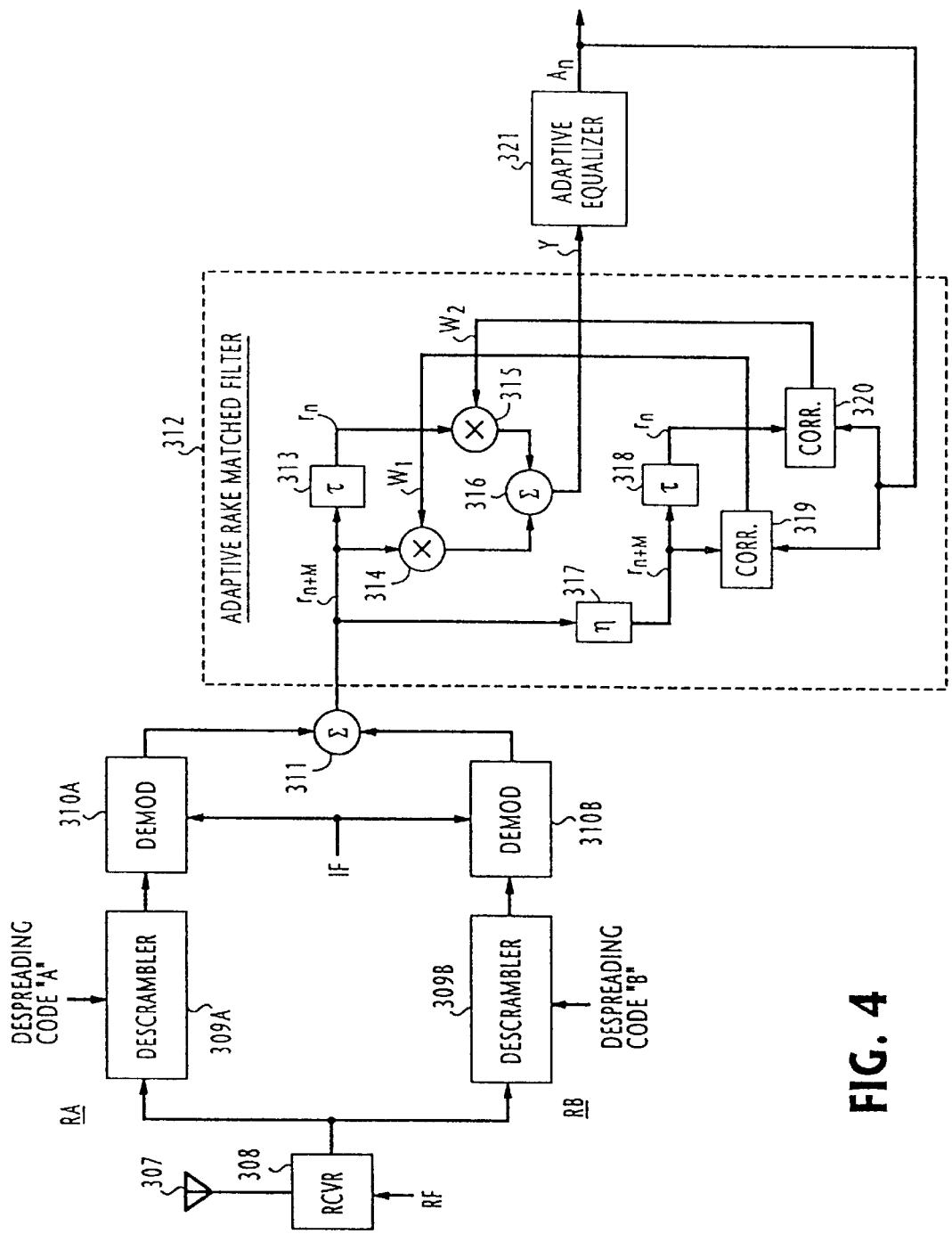
FIG. 4 is a block diagram of a modified receiving apparatus of the present invention.

According to a second embodiment of the present invention, the receive site of FIG. 1B is modified as shown in FIG. 4. This embodiment is characterized by the use of an adaptive RAKE matched filter (where the term "RAKE" implies that it collects the signal energy from all the received signal paths that fall within the span of its delay line and carry the same information and so its action is analogous to an ordinary garden rake). Similar to FIG. 1B, the receive site includes a receiver 308 to receive signals detected by antenna 307. Diversity branches RA and RB of the same configuration are connected to the output of receiver 308 for despreading the recovered code division multiplex signal in descramblers 309A, 309B, using the despreading codes "A" and "B" respectively to produce replicas of the non-delayed and τ-delayed modulated signals which appear at the outputs of quadrature modulators 102A, 102B (FIG. 1A). These signals are quadrature-demodulated in demodulators 310A, 310B to produce replicas of the non-delayed and τ-delayed baseband signals which appear at the inputs of quadrature modulators 102A, 102B. Unlike the first embodiment, timing alignment is not provided between the diversity branches. The outputs of the diversity branches are summed together in a combiner 311.

The matched filter 312 includes a first tapped delay line formed by a delay element 313 for receiving the output of combiner 311 to produce tap signals at the input and output of the delay element. These taps of the first delay line are connected to tap-weight complex multipliers 314 and 315, respectively, for weighting the tap signals by tap-weight coefficients $W_1$ and $W_2$ supplied respectively from correlators 319 and 320. The outputs of the multipliers 314 and 315 are combined together in a summer 316 and supplied to an adaptive equalizer 321 to produce a decision output symbol $A_n$.

A second tapped-delay line is formed by delay elements 317 and 318 to introduce delay times η and τ, successively to the output of combiner 311. The first inputs of correlators 319 and 320 are connected respectively to the input and output of delay element 318 and their second inputs are connected together to the output of the adaptive equalizer 321 for ISI cancellation. The delay time η introduced by delay element 317 corresponds to the amount of time for a data symbol to travel from the point of entry to the matched filter 312 to the point of delivery from the adaptive equalizer 321, whereby each data symbol appearing at the respective tap of the second delay line is made to coincide in time with a decision symbol $A_n$. With this timing alignment, correlators 319 and 320 derive first and second complex correlation signals $W_1$ and $W_2$ respectively from a first correlation between a decision symbol $A_{n+M}$ and a η-delayed data symbol $r_{n+M}$ and a second correlation between an earlier decision symbol $A_n$ and the (η+τ)-delayed earlier data symbol $r_n$. As in the previous embodiment, the correlation detectors 319 and 320 provide the time-averaging of the products of their input and output signal for a duration that is sufficiently longer than the symbol interval but sufficiently smaller than the interval at which a deep fade is likely to occur.

The outputs of the demodulators 310A and 310B are maximal-ratio diversity combined in the matched filter 312 as will be understood by the following description.

The impulse response at the output of combiner 311 is given in the form:

$$H(t) = h(t_0) \cdot \delta(t_0) + h(t_0+\tau) \cdot \delta(t_0+\tau) \quad (12)$$

where $\delta(\xi)=1$ if $\xi=t_0$ or $t_0+\tau$, and 0 if $\xi \neq t_0$ or $t_0+\tau$. The data symbol $r_n$ at the input of the matched filter 312 is represented by the convolutional integration of the impulse response H(t) by the transmitted symbol $a_n$ as follows:

$$r_n = \sum_{i=-\infty}^{\infty} H_{n-i} a_n \quad (13)$$

where $H_n$ represents the n-th sample of impulse response H when the latter is sampled at the symbol rate. Since the impulse response H is only valid at times $t_0$ and $t_0+\tau$, the symbol $r_n$ produced in response to the transmitted symbol $a_n$ at the output of the delay element 313 is given in the form:

$$r_n = h(t_0) \cdot a_n + h(t_0+\tau) \cdot a_{n-M} \quad (14)$$

where M is the number of symbols present in the delay time $\tau$.

The first term of Equation (13) represents the main component caused by the transmitted symbol $a_n$ and the second term is the ISI component caused by an earlier transmitted symbol $a_{n-M}$. Therefore, the later-arriving symbol $r_{n+M}$ at the input of delay element 313 is expressed as:

$$r_{n+M} = h(t_0) \cdot a_{n+M} + h(t_0+\tau) \cdot a_n \quad (15)$$

From the second tapped delay line, $\eta$-delayed versions of these symbols $r_{n+M}$ and $r_n$ are respectively supplied to correlators 319 and 320. In time coincidence, a decision output symbol $A_n$ is supplied to the correlators 319 and 320 to produce tap-weight signals $W_1$ and $W_2$, respectively. The tap-weight signal $W_2$ is obtained by solving the following Equation:

$$W_2 = E[r_n^* \cdot A_n] \quad (16)$$
$$= E[\{h(t_0) \cdot a_n + h(t_0+\tau) \cdot a_{n-M}\}^* \cdot A_n]$$
$$= h^*(t_0) E[a_n^* \cdot A_n] + h^*(t_0+\tau) E[a_{n-M}^* \cdot A_n]$$

Since the decision symbol $A_n$ is substantially equal to the transmitted symbol $a_n$, the symbol's autocorrelation $E[a_i^* \cdot a_j]$ can be represented by Kronecker delta $\delta_{ij}$=i(if i=j) or 0(if i≠j), and Equation (16) can be rewritten as:

$$W_2 = h^*(t_0) E[a_n^* \cdot a_n] = h^*(t_0) \quad (17)$$

In a similar manner, the tap-weight signal $W_1$ is obtained by solving the following Equation:

$$W_1 = E[r_{n+M}^* \cdot A_n] \quad (18)$$
$$= E[\{h(t_0) \cdot a_{n+M} + h(t_0+\tau) \cdot a_n\}^* \cdot A_n]$$
$$= h^*(t_0) E[a_{n+M}^* \cdot A_n] + h^*(t_0+\tau) E[a_n^* \cdot A_n]$$

-continued
$$= h^*(t_0+\tau) E[a_n^* \cdot a_n] = h^*(t_0+\tau)$$

The impulse response of the matched filter 312 is therefore given by:

$$H^*(-t) = h^*(t_0+\tau) \cdot \delta(t_0) + h^*(t_0) \cdot \delta(t_0+\tau) \quad (19)$$

Equation (19) is an estimate of the channel impulse response, which is a time-reversed complex conjugate of the channel impulse response. By using the tap-weight values $W_1$ and $W_2$ given by Equations (17) and (18), the tap signals on the first tapped-delay line are weighted, producing a convolutional filter response Y at the output of the matched filter 312 as follows:

$$Y = r_{n+M} \cdot W_1 + r_n \cdot W_2 \quad (20)$$
$$= h^*(t_0+\tau) h(t_0) \cdot a_{n+M} +$$
$$\{h^*(t_0) h(t_0) + h^*(t_0+\tau) h(t_0+\tau)\} a_n +$$
$$h^*(t_0) h(t_0+\tau) \cdot a_{n-M}$$

Figure 5A:
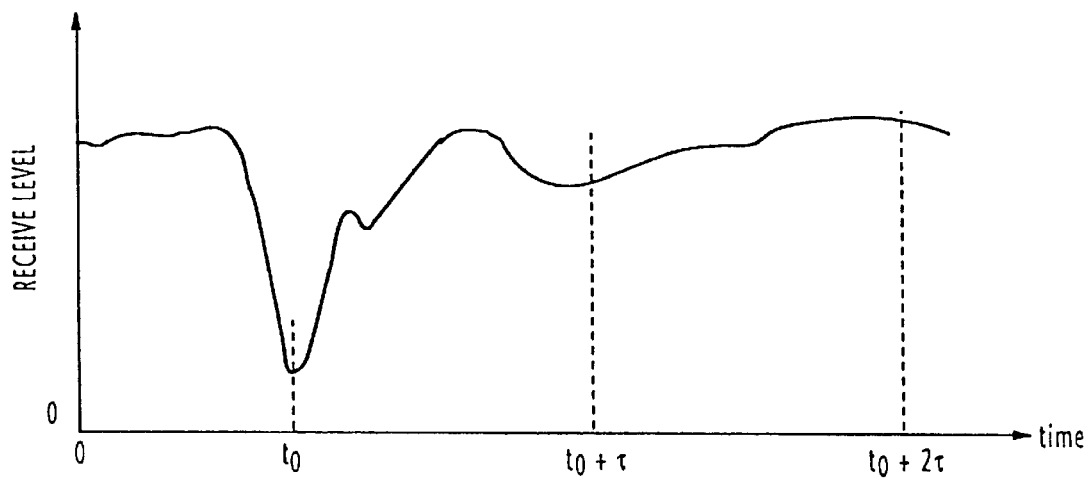
FIGS. 5A–5C show impulse response characteristics of the adaptive RAKE matched filter used in the modified receiving apparatus of FIG. 4.
Figure 5B:
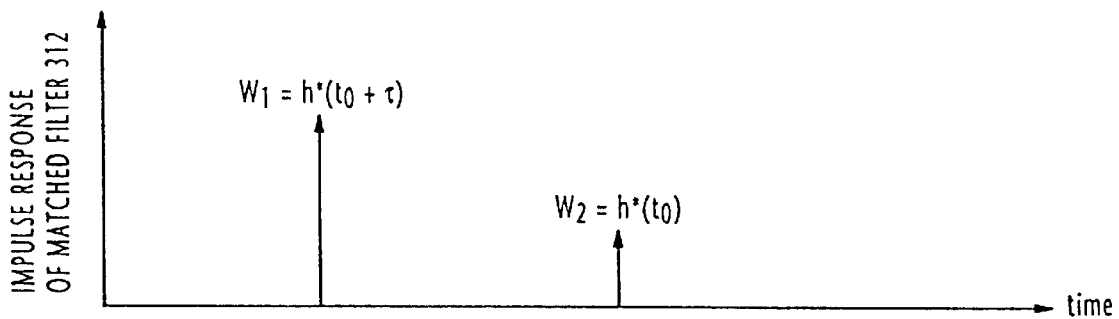
Figure 5C:
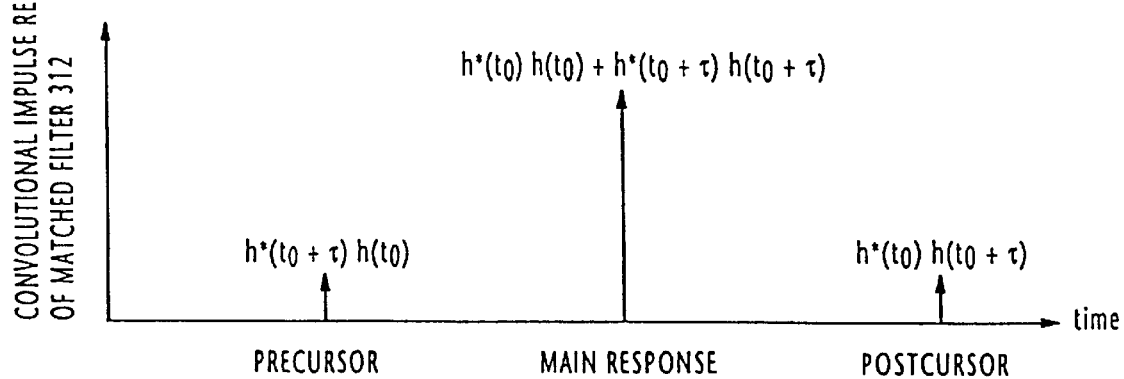

The second term of Equation (20) represents the maximal-ratio combined output of the signals of the time diversity branches RA and RB and the coefficient $h^*(t_0)h(t_0)+h^*(t_0+\tau)h(t_0+\tau)$ is the main convolutional impulse response of the matched filter 312 (see FIG. 5). The first and third terms of the equation are the intersymbol interferences from symbols $a_{n+M}$ and $a_{n-M}$, respectively, and their coefficients $h^*(t_0+\tau)h(t_0)$ and $h^*(t_0)h(t_0+\tau)$ are the precursor and postcursor convolutional impulse responses of the matched filter having a Rayleigh fading related, random phase and amplitude. Therefore, the power level of the first and third terms is significantly lower than the maximal-ratio combined component as illustrated in FIG. 5.

What is claimed is:

1. A radio communications system comprising:

a multiplexer circuit for producing a plurality of quadrature-modulated spread spectrum information-bearing signals using quadrature carriers of single frequency and a plurality of spreading codes, and combining the quadrature-modulated spread spectrum information-bearing signals to produce a code division multiplex signal, there being a predetermined inter-signal time delay between said quadrature-modulated spread spectrum information-bearing signals;

a transmitter for up-converting the code division multiplex signal to a radio-frequency signal;

a transmit antenna for transmitting the radio-frequency signal;

a receive antenna for receiving the transmitted signal;

a receiver for down-converting the received signal to recover said code division multiplex signal;

a demultiplexer circuit for converting a plurality of quadrature-modulated component signals contained in the recovered multiplex signal to a plurality of information-bearing signals using quadrature carriers of said single frequency and a plurality of despreading codes respectively identical to the spreading codes;

a first combiner for combining said plurality of information-bearing signals into a combined information-bearing signal;

a delay line having a plurality of successive taps for receiving the combined information-bearing signal, the delay time between the successive taps corresponding to said predetermined inter-signal time delay;

a plurality of complex multipliers for respectively weighting tap signals from the taps of the delay line by complex weighting factors;

a second combiner for combining the weighted tap signals to produce a combined weighted signal;

an adaptive equalizer for producing a decision output from the combined weighted signal; and a plurality of correlation detectors for respectively deriving said plurality of complex weighting factors from correlations between the decision output of the adaptive equalizer and a plurality of delayed versions of tap signals at the taps of the delay line, one of the delayed versions being time coincident with said decision output.

2. A radio communications system as claimed in claim 1, wherein said predetermined inter-signal time delay is greater than symbol interval of the information-bearing signals.

3. A radio communications system as claimed in claim 1, wherein each of said correlation detectors multiplies the decision output by one of the delayed versions of tap signals to produce complex products and averages the complex products during a time interval longer than symbol interval of the tap signals but shorter than intervals at which fading is likely to occur.

4. A receiving apparatus for a radio communications system wherein a plurality of quadrature-modulated spread spectrum information-bearing signals are produced using quadrature carriers of single frequency and a plurality of spreading codes, and the quadrature-modulated spread spectrum information-bearing signals are combined into a code division multiplex signal which is up-converted to a radio-frequency signal and transmitted, there being a predetermined inter-signal time delay between said quadrature-modulated spread spectrum information-bearing signals, the apparatus comprising:

an antenna for receiving the transmitted radio-frequency signal;

a receiver for down-converting the received radio-frequency signal to recover said code division multiplex signal;

a demultiplexer circuit for converting a plurality of quadrature-modulated component signals contained in the recovered multiplex signal to a plurality of information-bearing signals using quadrature carriers of said single frequency and a plurality of despreading codes respectively identical to the spreading codes;

a first combiner for combining said plurality of information-bearing signals into a combined information-bearing signal;

a delay line having a plurality of successive taps for receiving the combined information-bearing signal, the delay time between the successive taps corresponding to said predetermined inter-signal time delay;

a plurality of complex multipliers for respectively weighting tap signals from the taps of the delay line by complex weighting factors;

a second combiner for combining the weighted tap signals to produce a combined weighted signal;

an adaptive equalizer for producing a decision output from the combined weighted signal; and a plurality of correlation detectors for respectively deriving said plurality of complex weighting factors from correlations between the decision output of the adaptive equalizer and a plurality of delayed versions of tap signals at the taps of the delay line, one of the delayed versions being time coincident with said decision output.

5. A receiving apparatus as claimed in claim 4, wherein each of said correlation detectors multiplies the decision output by a corresponding one of the delayed versions of tap signals to produce complex products and averages the complex products during a time interval longer than symbol interval of the tap signals but shorter than intervals at which fading is likely to occur.

6. A method of communication comprising the steps of:

a) converting an information-bearing signal to a plurality of quadrature-modulated spread spectrum signals using quadrature carriers of single frequency and a plurality of spreading codes, there being a predetermined inter-signal time delay between the quadrature-modulated spread spectrum signals, and multiplexing the quadrature-modulated spread spectrum signals into a code division multiplex signal;

b) up-converting the code division multiplex signal to a radio-frequency signal and transmitting the radio-frequency signal;

c) receiving the radio-frequency signal and down-converting the received radio-frequency signal to recover said code division multiplex signal;

d) converting a plurality of quadrature-modulated spread spectrum signals contained in the recovered code division multiplex signal to a plurality of information-bearing signals using quadrature carriers of said single frequency and a plurality of despreading codes respectively identical to the spreading codes;

e) combining said plurality of information-bearing signals into a combined information-bearing signal;

f) supplying the combined information-bearing signal to a tapped-delay line to produce a series of successively delayed tap signals, respectively weighting the tap signals from the tapped-delay line by a plurality of complex weighting factors, and combining the weighted tap signals to produce a combined weighted tap signal;

g) producing a decision output from the combined weighted tap signal; and h) providing a delay to the tap signals from the tapped-delay line to produce a plurality of delayed versions of the tap signals so that one of the delayed versions is time coincident with said decision output, and deriving said plurality of complex weighting factors from correlations between the decision output and the delayed versions of the tap signals.

7. A method as claimed in claim 6, the step (h) comprises the steps of:

$h_1$) multiplying the decision output by each of the delayed versions of tap signals to produce a plurality of series of complex products; and $h_2$) averaging the complex products of each series during a time interval longer than symbol interval of the tap signals but shorter than intervals at which fading is likely to occur.

* * * * *